(12) United States Patent
Huddar et al.

(10) Patent No.: US 9,122,800 B1
(45) Date of Patent: Sep. 1, 2015

(54) SYSTEM AND METHOD OF NON-INTRUSIVE MEASUREMENT OF MEMORY ACCESS PROFILES OF THREADS IN A MULTI-CORE PROCESSOR

(71) Applicant: Honeywell International Inc., Morristown, NJ (US)

(72) Inventors: Vinay Huddar, Karnataka (IN); Balasubramanyam Ravindranath, Karnataka (IN)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 14/292,473

(22) Filed: May 30, 2014

(51) Int. Cl.
*G06F 9/44* (2006.01)
*G06F 11/36* (2006.01)

(52) U.S. Cl.
CPC ........ *G06F 11/3664* (2013.01); *G06F 11/3688* (2013.01)

(58) Field of Classification Search
CPC .......... G06F 11/3471; G06F 2201/865; G06F 8/443; G06F 11/30; G06F 11/34; G06F 11/3664; G06F 11/3688
USPC .................................................. 717/124, 127
See application file for complete search history.

(56) References Cited

U.S. PATENT DOCUMENTS 5,657,253 A * 8/1997 Dreyer et al. ................. 702/186
5,835,705 A * 11/1998 Larsen et al. ................. 714/47.1
6,718,286 B2 * 4/2004 Rivin et al. ................... 702/186
8,478,948 B2 * 7/2013 Panchenko et al. ........... 711/154
8,607,202 B2 12/2013 Nadbath et al.
2013/0332933 A1 12/2013 Knauth et al.
2014/0201452 A1 * 7/2014 Meredith ....................... 711/130

FOREIGN PATENT DOCUMENTS

KR 101356033 1/2014

OTHER PUBLICATIONS

John McCorquodale et al, The Uintah Parallelism Infrastructure: A Performance Evaluation on the SGI Origin 2000, 2001, Scientific Computing and Imaging Institute, University of Utah, Salt Lake City, UT 84112.*
Brandenburg et al, Memory access analysis and optimization of a parallel H.264/SVC decoder for an embedded multi-core platform, Oct. 8-10, 2013, IEEE, Design and Architectures for Signal and Image Processing (DASIP), 2013 Conference on, pp. 304-311.*

(Continued)

*Primary Examiner* — Ryan Coyer
*Assistant Examiner* — Daniel Wei
(74) *Attorney, Agent, or Firm* — Fogg & Powers LLC

(57) ABSTRACT

A method of non-intrusively measuring a memory profile of a thread under test comprises executing a detection thread in parallel with the thread under test, the thread under test executed on a first core of a multi-core processor and the detection thread executed on a second core of the multi-core processor; generating a pattern of cache miss memory reads on the detection thread in order to access a memory shared by the first core and the second core; periodically obtaining read times in the detection thread indicating the amount of time taken to complete the cache miss memory reads generated on the detection thread; and determining the memory profile of the thread under test based on the obtained read times of the detection thread.

18 Claims, 5 Drawing Sheets

(56) References Cited

OTHER PUBLICATIONS

Tudor et al., "A Practical Approach for Performance Analysis of Shared-Memory Programs", "Proceedings of the 25th IEEE International Parallel & Distributed Processing Symposium", May 16-20, 2011, pp. 1-12, Publisher: IEEE, Published in: US.

Eklov et al., "Design and Evaluation of the Bandwidth Bandit", Feb. 2012, pp. 1-11.

Eranian, "What can performance do for memory subsystem analysis", "Proceedings of the 2008 ACM SIGPLAN workshop on Memory systems performance and correctness", 2008, pp. 26-30.

Inam et al., "Bandwidth Measurement using Performance Counters for Predictable Multicore Software", "2012 IEEE 17th Conference on Emerging Technologies & Factory Automation (ETFA)", Sep. 17-21, 2012, pp. 1-4, Publisher: IEEE.

* cited by examiner

SYSTEM AND METHOD OF NON-INTRUSIVE MEASUREMENT OF MEMORY ACCESS PROFILES OF THREADS IN A MULTI-CORE PROCESSOR

BACKGROUND

One of the primary benefits of using a Multi-Core Processor is increased Central Processing Unit (CPU) bandwidth that can be used for speeding up an application by having pieces of it running in parallel in multiple cores or bringing together disparate applications onto the same processor, thereby realizing SWaP (Size, Weight and Power) benefits. Contemporary multi-core processor architectures contain resources that are shared between cores, such as Last Level Cache, Memory Controller, I/O interfaces and, in some cases, the bus connecting these resources to the cores. Contention for these shared resources from multiple cores introduces latencies. These contention-related latencies have a negative impact on the execution times of threads that are scheduled for parallel execution on multiple cores. The interference from a thread running on one core on another thread running on a different core is commonly referred to as "Cross-Core Interference".

SUMMARY

In one embodiment, a method of non-intrusively measuring a memory profile of a thread under test is provided. The method comprises executing a detection thread in parallel with the thread under test, the thread under test executed on a first core of a multi-core processor and the detection thread executed on a second core of the multi-core processor; generating a pattern of cache miss memory reads on the detection thread in order to access a memory shared by the first core and the second core; periodically obtaining read times in the detection thread indicating the amount of time taken to complete the cache miss memory reads generated on the detection thread; and determining the memory profile of the thread under test based on the obtained read times of the detection thread.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
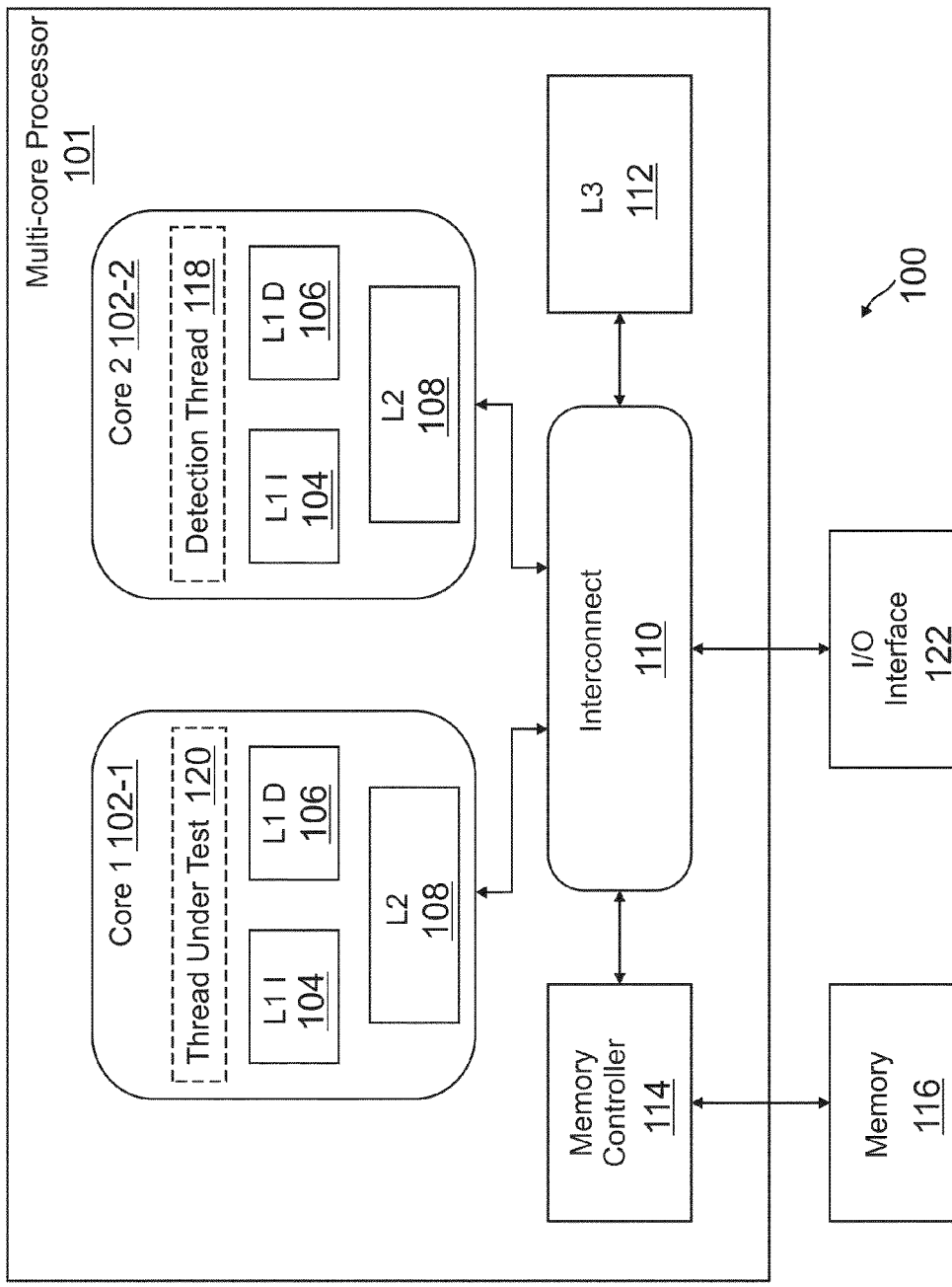
FIG. 1 is high level block diagram of one embodiment of an exemplary system for non-intrusively measuring a memory access profile.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a block diagram of one embodiment of an exemplary system 100 configured to non-intrusively measure a memory access profile of a thread. A thread is also commonly referred to as a process or a task which executes as part of a program. It is to be understood that system 100 is presented by way of example only and that, in other embodiments, other components can be included in addition to or in lieu of those shown in FIG. 1. System 100 includes a multi-core processor 101 having a plurality of cores 102. In particular, in the example shown in FIG. 1, multi-core processor 101 includes a first core 102-1 and a second core 102-2. Each of the first core 102-1 and second core 102-2 includes a respective level 1 instruction cache 104, level 1 data cache 106, and level 2 cache 108. The function and operation of caches is understood by one of skill in the art and not explained in more detailed herein. As shown in FIG. 1, the respective caches 104, 106, and 108 in cores 102-1 and 102-2 are not shared between the cores. However, it is to be understood that in other embodiments, cache 108 could be a shared cache accessible by both cores 102-1 and 102-2.

The exemplary multi-core processor 101 also includes an interconnect 110, a level 3 cache 112, and a memory controller 114. In some embodiments, the interconnect 110 is implemented as a queue used to queue and manage memory access requests from core 102-1 and core 102-2 to enable both cores to access the shared level 3 cache, a memory 116 coupled to the multi-core processor 101, and an Input/Output (I/O) interface 122 coupled to the multi-core processor 101. The memory controller 114 enables read and write operations to the memory 116, as understood by one of skill in the art. The memory 116 can be implemented using any suitable Random Access Memory (RAM), such as, but not limited to, synchronous dynamic RAM (SDRAM), double data rate SDRAM (DDR SDRAM), and Rambus dynamic RAM (RDRAM).

As understood by one of skill in the art, a multi-core processor includes various Performance Monitoring Counters that count intra-core and extra-core events, such as, but not limited to, number of load instructions retired, number of lines brought into level 1 cache, number of level 2 cache misses, number of level 3 cache misses, etc. System 100 is configured to leverage the Performance Monitoring Counters (PMC) of the multi-core processor in order to provide non-intrusive measurements of a thread's memory access profile. As used herein, the term "non-intrusive" means that the thread being measured is not interrupted or instrumented with additional code to measure the memory access profile. For example, utilizing the techniques described herein, no changes to the thread being measured are needed. The non-intrusive nature of the techniques described herein provides several benefits over conventional techniques of obtaining a memory profile for a thread. For example, many conventional techniques require the code of the thread being measured (also referred to herein as the thread under test) be instrumented or changed to include periodic measurement code that captures these performance counters or other indicators. Thus, the additional code that is inserted causes the execution of the thread under test to be interrupted periodically. The interruptions in the execution of the thread under test causes the thread under test to run slower when instrumented for performance measurement as compared to its normal execution speed. In addition, the additional code may change the memory access behavior of the thread under test. The techniques described herein alleviate these issues through a non-intrusive method of measuring the memory profile of a thread under test.

In particular, a thread under test 120 is executed on the core 102-1 while a detection thread 118 is executed on the core 102-2. The detection thread 118 is executed at the same time as the thread under test 120. For example, the detection thread 118 can be scheduled to start at the same time as the thread under test 120 and to execute for the same duration as the thread under test 120. In some embodiments, a real time operating system that supports a multi-core processor is used to schedule the detection thread 118 and the thread under test 120 as well as map each thread to a specific core. In addition, in some embodiments, the thread under test 120 and the detection thread 118 are executed with approximately the same thread budget and period (i.e. thread rate of execution). For example, in one embodiment, each thread has a total execution time of 5 seconds (also referred to as wall time), a thread rate of 80 hz and thread budget of 100 microseconds which results in 400 total frames of thread execution (12.5 milliseconds per frame). It is to be understood that the above values are provided by way of example only. Furthermore, in some embodiments, a cache partitioning feature of a real time operating system is used to partition the last level cache (level 3 cache 112 in this example) when the last level cache is shared by the first core 102-1 and the second core 102-2. By partitioning the cache, the thread under test 120 and the detection thread 118 do not interfere with each other at the shared cache level. In this way, the measured interference is the cross-core interference for access to the shared memory 116. In other embodiments, other hardware or software techniques can be used to partition the shared cache.

The detection thread 118 is configured to execute a pattern of cache miss memory reads. That is, the data for each memory read is not found in any of the caches so the memory reads access the random access memory 116. Hence, as used herein, the term 'cache miss memory read' is defined to mean a memory access of the random access memory via one or more caches in which the requested data is not stored in any of the one or more caches. Although the exemplary embodiments are described herein with respect to cache miss memory reads, the detection thread 118 can be configured to generate a pattern of other peripheral component accesses in other embodiments. A peripheral component, as used herein, is a component coupled to the multi-core processor 101, but not integral to the multi-core processor 101. For example, the peripheral components can include the memory 116 and the I/O interface 122. Thus, a peripheral component access can include an I/O read/write to the I/O interface 122 and/or a memory read to the memory 116. Thus, in addition to or in lieu of cache miss memory reads, the detection thread 118 can generate a pattern of I/O reads and/or writes in some embodiments.

Figure 2:
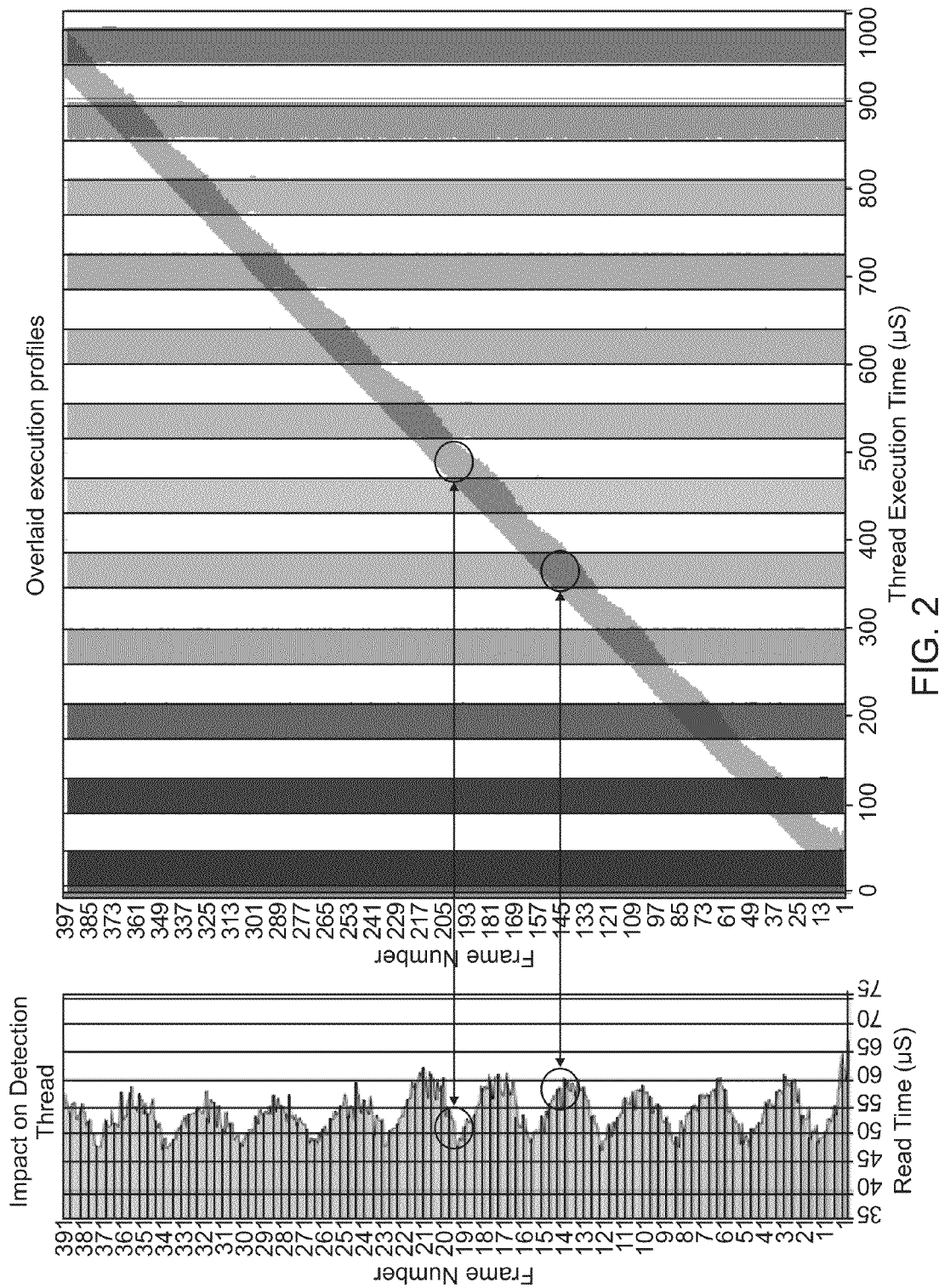
FIG. 2 is a graph of one embodiment of exemplary measurements of a memory access profile.

The detection thread 118 generates a fixed number of cache miss memory reads without intervening delay in each period or frame of execution. That is, the detection thread 118 generates a fixed number of bursts of memory reads in each period. As used herein, the terms 'frame', 'period', and 'frame of execution' can be used interchangeably. In some embodiments, the start time of a burst in each frame is shifted. For example, as shown in FIG. 2, each of 400 frames of execution includes a burst of cache miss memory reads. In the example, the start time is at zero in the first frame and gradually moves toward the last part of each frame. This is depicted as the slanting bar on the graph of overlaid execution profiles in FIG. 2. The width of the slanted bar in each frame is the same indicating that the same number of cache miss memory read bursts is performed in each frame.

The vertical bars in the graphs of overlaid execution profile represent memory accesses (reads and/or writes) performed by the exemplary thread under test 120. In this exemplary embodiment, the thread under test 120 performs a combination of memory reads and writes in each frame. In particular, the first vertical bar starting at the left of the graph contains only memory reads and the last vertical bar at the right contains only memory writes. Each vertical bar in between the first and last contains a combination of reads and writes. The ratio of reads to writes gradually changes from all reads on the left to all writes on the right of the graph of overlaid execution profiles. The white space between each vertical bar represents periods of no memory access activity from the thread under test 120.

The graph of impact on the detection thread in FIG. 2 correlates to the graph of overlaid execution profiles. In particular, the graph of overlaid execution profiles represents the memory access operations of the detection thread 118 and the thread under test 120. The graph of impact on the detection thread in FIG. 2 represents the time taken for respective bursts of memory reads of the detection thread to complete. The time taken for a burst of memory reads to complete on the detection thread 118 can be measured by Performance Monitoring Counter feature of the processor. For example, the processor can measure the read time for cache miss memory reads performed by the core executing the detection thread.

The detection thread 118 can be configured in some embodiments to periodically obtain a measure of the read times. For example, the detection thread can be configured to capture the PMC count at predetermined intervals. In one example, the detection thread 118 has a frame execution time of 100 microseconds with a measurement resolution of 10 microseconds. In such an embodiment, the detection thread 118 is configured to capture the PMC count every 10 microseconds using the processor's Time Stamp Counter. A measurement zone is a burst of memory reads followed by a period of idle time. Thus, for a resolution of 10 microseconds, an exemplary measurement zone can include a 9 microsecond burst of memory reads followed by a 1 microsecond idle time. The measurement zone idle time can be used to accommodate increases in cache miss memory read latencies caused by interference in the shared memory bus and/or the shared memory controller, for example. The idle time can also be used for capturing the PMC count or for measuring the total read time of the generated cache memory read bursts using the Time Stamp Counter (TSC). For a 100 microsecond frame execution time with a resolution of 10 microseconds, there are 10 measurement zones. The measurement zone size can be adjusted to change the resolution. For example, by increasing the number of measurement zones, the number of sampling points increases and, hence, the resolution is higher. The number of measurement zones per period (e.g. frame execution time) is inversely proportional with the size of each measurement zone. That is, increasing the number of measurement zones reduces the size of each measurement zone. For example, increasing the number of measurement zones from 10 to 20 in the above example, reduces the size of each measurement zone from 10 microseconds to 5 microseconds for an execution period of 100 microseconds.

Smaller measurement zones increase resolution by capturing the PMC counts more often. However, as the size of the measurement zone decreases, the level of impact seen or detected by detection thread in each measurement zone also decreases. This is because fewer cache miss memory reads are performed in the smaller measurement zones. Thus, in some embodiments, the size of the measurement zone is configurable or adjustable based on the specific implementation, such as to take into consideration factors like resolution and impact detected.

By analyzing the read times of the detection thread 118, a profile of the memory accesses performed by the thread under test 120 can be obtained. For example, as shown in FIG. 2, the peaks in cache miss read time for the detection thread 118 correspond to periods of memory access by the thread under test 120 and valleys in the cache miss read time for the detection thread 118 correspond to periods of time when the thread under test 120 is not performing memory accesses. As noted in FIG. 2, the detection thread 120 is able to detect both memory reads and memory writes by the thread under test 120 since peaks occur at each overlap regardless of the read/write ratio.

Figure 3:
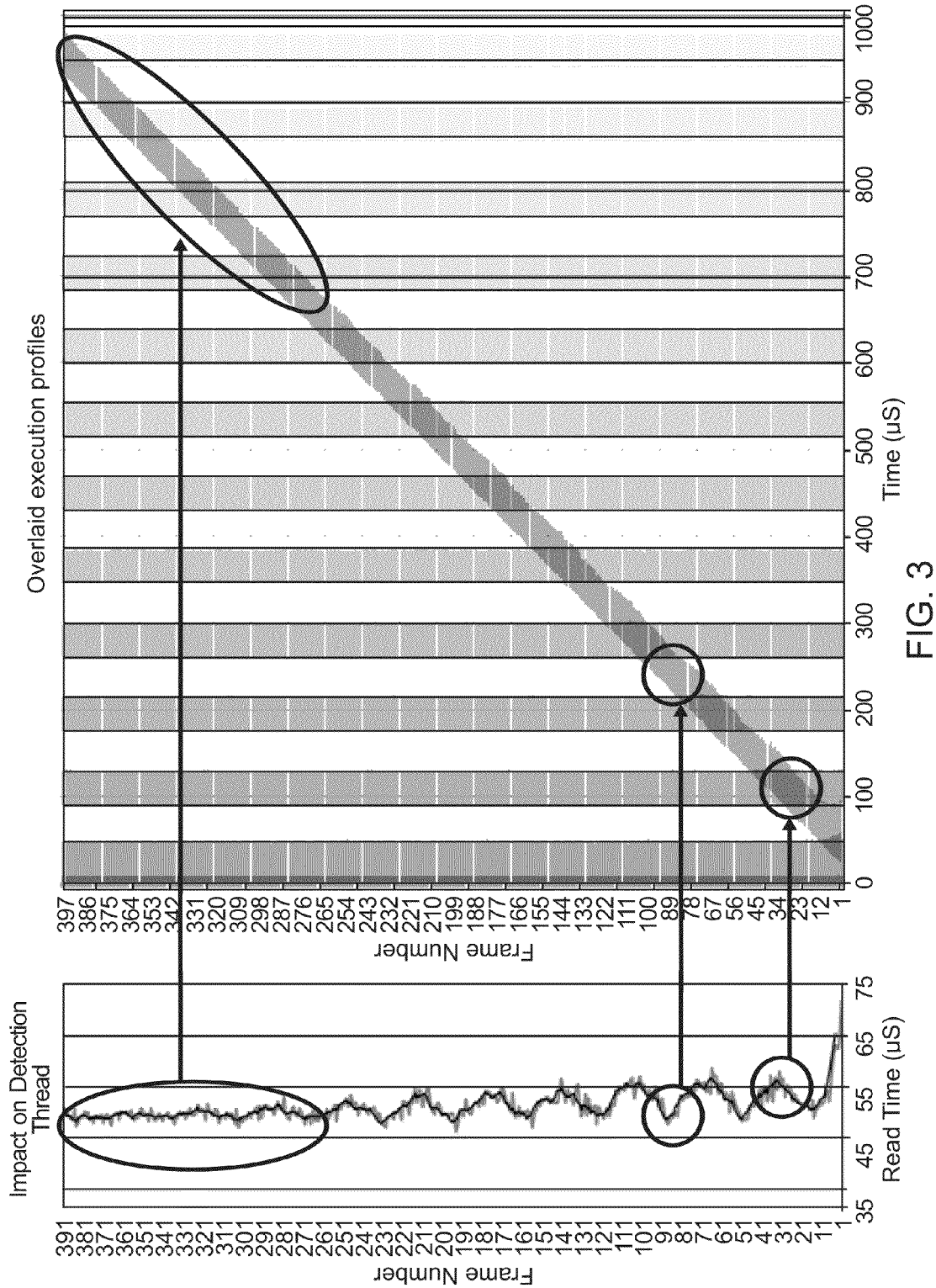
FIG. 3 is a graph of another embodiment of exemplary measurements of a memory access profile.

It is to be understood that FIG. 2 is presented by way of example only to illustrate the detection of both memory reads and memory writes. However, it is to be understood that the detection thread 118 can also detect profiles other than that shown in FIG. 2. For example, in the exemplary FIG. 3, the thread under test 120 is configured with different memory access densities. Memory access density refers to the number of memory accesses (i.e. reads and writes) per unit of time. In FIG. 3, the vertical bar furthest to the left of the graph of overlaid profiles represents the highest density (e.g. as many memory accesses per unit of time in the thread under test as possible without any intentional delay between memory accesses) and the vertical bar to the right represents the lowest density (e.g. memory accesses with relatively large intentional delay between memory accesses in the thread under test). The vertical bars in between the most left and most right have varying densities to transition from higher density to lower density. The terms higher and lower are relative to each other. That is, higher density means that the thread under test has more memory accesses per unit of time than a period of lower density. The terms are not limited to a specific numerical value. As shown in the graph of impact on the cache miss read times of the detection thread, peaks occur at periods of higher density and valleys occur at periods of no activity. Also, the peaks become smaller as the memory access density decreases. Thus, through the detection thread, represented by the slanted bar, memory access density can also be detected.

Figure 4:
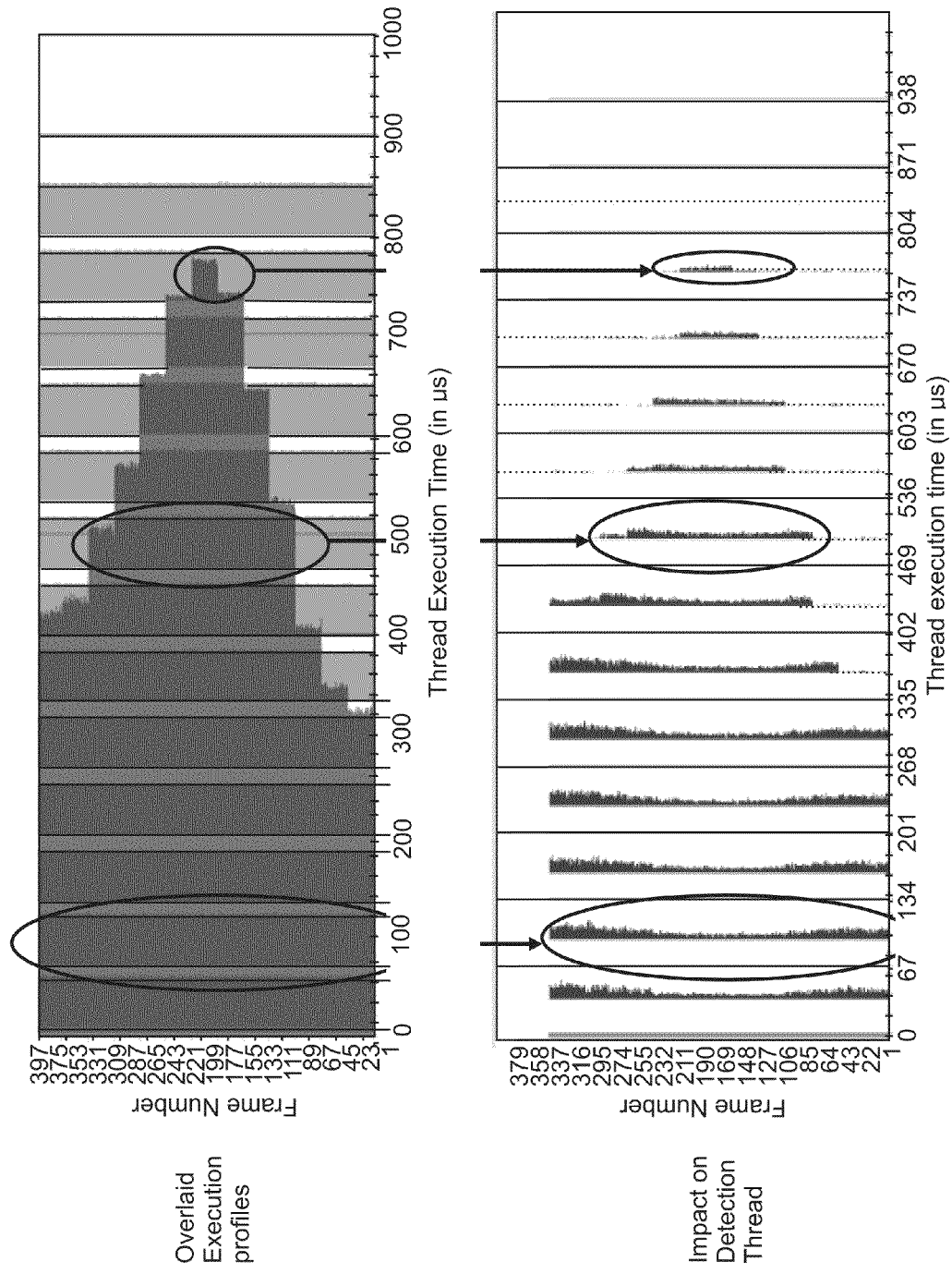
FIG. 4 is a graph of another embodiment of exemplary measurements of a memory access profile.

Additionally, the specific pattern of cache miss memory reads performed by the detection thread 118 is not limited to the slanted bar as depicted in FIGS. 2 and 3. For example, in FIG. 4 the detection thread 118 is configured to generate a pattern of groups of memory read bursts in each frame, the groups of bursts separated from each other by a period of no activity. The pattern of memory read bursts is repeated in each frame. Hence, in FIG. 4 the memory read bursts are depicted by the vertical bars in the graph of overlaid execution profiles. The space between each vertical bar represents a period of no memory access activity from the detection thread 118. Furthermore, in the example of FIG. 4, the thread under test 120 generates memory accesses in varying read-write ratios and densities as depicted by the stepped horizontal bars in the graph of overlaid profiles. It is to be understood that FIG. 4 is presented by way of example only and that the execution profile of each thread being tested will vary based on the code of the thread and the functions performed by the thread.

The graph of impact on the detection thread depicts differences in the read times from running the detection thread 118 alone and running the detection thread in parallel with the thread under test 120. The differences correspond to the level of memory accesses performed by the thread under test 102. Thus, by observing the changes, a memory access profile for the thread under test 120 can be identified.

Notably, by observing the memory read latencies of the detection thread 118, both types of memory accesses (reads and writes) performed by the thread under test can be detected, as well as different ratios of the two access types and a range of access densities. This is beneficial since a typical application thread can perform a mix of memory reads and writes of various densities during its execution time. For example, an application that works on a data set stored in non-volatile memory and prepares it for display can involve fetching the data from memory, decompressing the data if it is stored in a compressed form, backing up the decompressed data in a software cache for later reuse, transforming the data in appropriate ways before writing it to a location from where it is picked up by a display rendering process/thread.

The memory access profile of each of the above exemplary operations is different with respect to the ratio of memory reads to memory writes and the computational delay between them. For example, data decompression typically involves more writes than reads since the compressed data is smaller than its decompressed version. Also, a decompression task is typically more memory intensive than CPU intensive. That is, more time is spent reading and writing data from/to memory than deciphering the compressed data. On the other hand, caching decompressed data for later use typically involves approximately equal number of reads and writes with very little computational delay between the two. It is to be understood that software cache of the application is different from "hardware cache" provided in the processor architecture. Software cache is understood to be a part of RAM that is used for temporarily backing up data.

The exemplary data transformation operation is typically more CPU intensive than memory intensive. In particular, transformation of data from one form to another typically involves reading a unit of data from memory, performing multiple complex instructions (like division and multiplication) and writing the output back to memory. Thus, transformation typically involves about an equal number of reads and writes with more computation delay between them. In other words, the density of memory accesses per unit of time is typically lower for data transformation than with the caching decompressed data operation, for example.

Hence, through the use of the detection thread 118, execution of the thread under test 120 does not need to be interrupted or changed in order to measure a memory access profile of the thread under test 120. For example, no additional code needs to be inserted into the thread under test 120. The detection thread 118, therefore, provides a non-intrusive technique for measuring the memory access profile of the thread under test 120. The detection thread 118 is able to measure when the memory accesses occur over the period of the thread under test's thread execution time as well as how dense (number of requests per unit of time) the memory access requests are. Furthermore, since the thread under test 120 is not instrumented or otherwise interrupted in order to measure the memory profile, the memory profile more closely follows the temporal behavior of the thread than in conventional systems which interrupt the thread under test, or which instrument the code of thread under test. That is, the memory profile is closer to the real time execution of the thread which is beneficial in scheduling threads based on the respective memory profiles. In addition, since the thread under test 120 is not instrumented or intentionally interrupted to measure the profile, measurement of the memory profile can typically completed faster than with conventional methods which instrument the code.

The memory access profile for the various threads, measured using the detection thread 118, can then be used to schedule the threads for execution. For example, the memory access profiles of different threads can be used to pair threads together that will have less interference on one another based on their measured memory access profile. Pairing threads refers to scheduling the execution time of the threads to overlap, such as by scheduling them at the same time on different cores. For example, a thread having a memory access intensive profile could be paired to execute simultaneously with a thread having a processor or computational intensive profile. A computational intensive thread is a thread with low density of memory accesses, such as a thread which limits its accesses to the non-shared caches of its respective core (e.g. L1 cache 104/106 and L2 cache 108). Similarly, two memory access intensive threads can be paired to execute at about the same time if their memory access times do not overlap. For example, if the memory access profile of a thread indicates the thread performs most of its memory accesses in the first half of its execution frame, then it can be paired with another thread that performs most of its memory accesses in the second half of its execution frame. Another exemplary pairing includes a memory intensive thread (e.g. a thread with high density of memory accesses) and an I/O intensive thread (e.g. a thread which generates a relatively high number of accesses to the I/O interface 122 as compared to the memory intensive thread with which it is paired).

Figure 5:
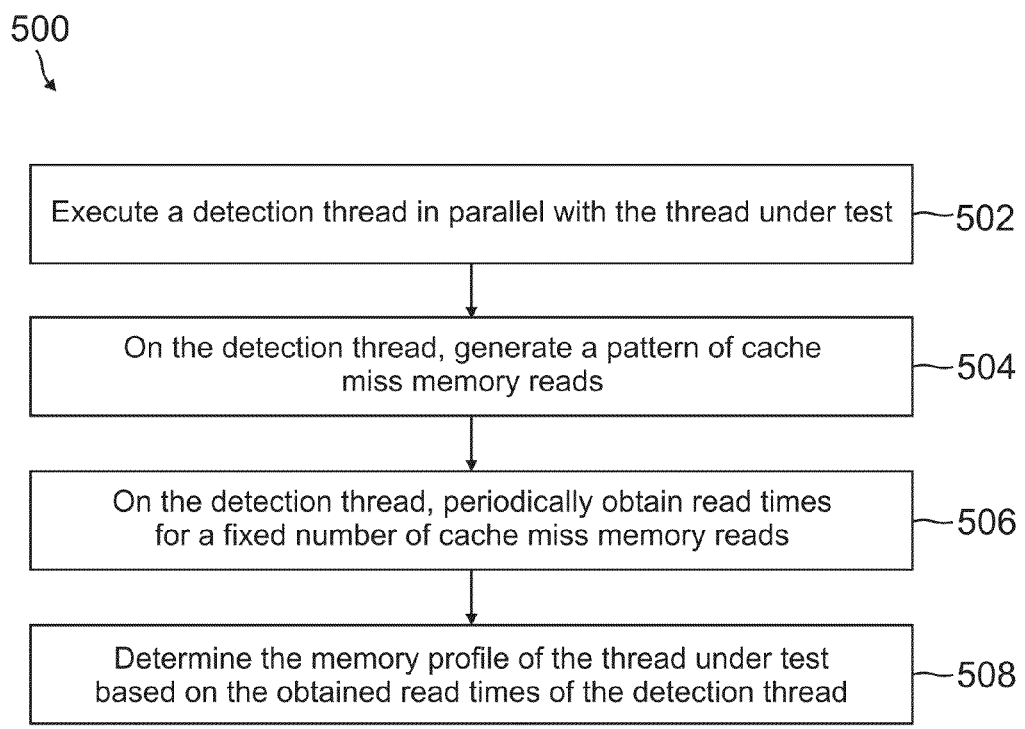
FIG. 5 is a flow chart depicting one embodiment of an exemplary method of non-intrusively measuring a memory access profile.

FIG. 5 is a flow chart depicting one embodiment of a method of non-intrusively measuring a memory profile of a thread under test. At block 502, a detection thread is executed in parallel with the thread under test. The thread under test is executed on a first core of a multi-core processor and the detection thread is executed on a second core of the multi-core processor, as discussed above. For example, both the detection thread and the thread under test are executed with approximately the same thread budget and period, in some embodiments. In addition, in some embodiments, the detection thread is scheduled to start at the same time as the thread under test and to execute for the same duration as the thread under test.

At block 504, the detection thread generates a pattern of cache miss memory reads in order to access a shared memory. The shared memory can be implemented, for example, as one of synchronous dynamic RAM (SDRAM), double data rate SDRAM (DDR SDRAM), and Rambus dynamic RAM (RDRAM). The memory is shared between the first core and the second core of the multi-core processing unit. The shared memory is not a cache shared by the first and second cores. In some embodiments, the pattern of cache miss memory reads comprises a pattern of groups of memory read bursts in each of a plurality of frames. The groups of bursts in each frame are separated from each other by a period of no memory access activity, as discussed above.

At block 506, read times are periodically obtained for a fixed number of the cache miss memory reads. The read times indicate the amount of time taken to complete the cache miss memory reads generated on the detection thread. In some embodiments, obtaining the read times includes setting a measurement zone size. A measurement zone comprises a period of time for cache miss memory read operations followed by a period of idle time without cache miss memory read operations. As discussed above, the idle time can be used to accommodate increases in read latencies and/or for obtaining Performance Monitoring Counter (PMC) counts from the multi-core processor. Thus, setting the measurement zone size can determine the periodicity for obtaining the read times.

At block 508, the memory profile of the thread under test is determined based on the obtained read times of the detection thread. For example, as discussed above, the read times for the detection thread indicate periods of time when the detection thread is contending for access of the shared memory with the thread under test. Thus, longer read times indicate periods of more memory access activity by the thread under test than shorter read times. Thus, the memory access profile is represented by the read times of the detection thread, as discussed above.

In some embodiments, a cache shared by the first core and the second core is partitioned such that the detection thread and the thread under test do not contend for access to the shared cache. For example, in some embodiments, the first and second cores share a last level cache (e.g. level 3 cache). By partitioning the shared cache, the read times obtained for the detection thread are related to contention for the shared memory and not for the shared cache. In other embodiments, a cache is not shared by the first and second cores. Hence, in such embodiments, a shared cache is not partitioned.

In addition, in some embodiments, the thread under test is optionally paired with a second thread based on the respective memory profile of both threads, as discussed above. For example, a memory intensive thread can be paired with a computational intensive or an I/O intensive thread. Hence, the measured memory profile can indicate, for example, the lowest number of memory accesses performed by the thread under test in a particular frame or set of frames, the highest number of memory accesses performed by the thread under test in a particular frame or set of frames, and the lowest and/or highest memory access density for the thread under test for a particular time window.

Method 500 can be implemented by a processing unit, such as the multi-core processor shown in FIG. 1. The processing unit includes or functions with software programs, firmware or other computer readable instructions for carrying out various methods, process tasks, calculations, and control functions, used in the non-intrusively measuring the memory profile of a thread under test.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk—Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

EXEMPLARY EMBODIMENTS

Example 1 includes a method of non-intrusively measuring a memory profile of a thread under test, the method comprising: executing a detection thread in parallel with the thread under test, the thread under test executed on a first core of a multi-core processor and the detection thread executed on a second core of the multi-core processor; generating a pattern of cache miss memory reads on the detection thread in order to access a memory shared by the first core and the second core; periodically obtaining read times in the detection thread indicating the amount of time taken to complete the cache miss memory reads generated on the detection thread; and determining the memory profile of the thread under test based on the obtained read times of the detection thread.

Example 2 includes the method of Example 1, wherein executing the detection thread in parallel with the thread under test includes executing both the detection thread and the thread under test with approximately the same thread budget and period.

Example 3 includes the method of any of Examples 1-2, wherein executing the detection thread in parallel with the thread under test comprises scheduling the detection thread to start at the same time as the thread under test and to execute for the same duration as the thread under test.

Example 4 includes the method of any of Examples 1-3, wherein generating a pattern of cache miss memory reads with the detection thread comprises generating a pattern of groups of memory read bursts in each of a plurality of frames, the groups of bursts in each frame separated from each other by a period of no memory access activity.

Example 5 includes the method of any of Examples 1-4, further comprising partitioning a cache shared by the first core and the second core such that the detection thread and the thread under test do not interfere at the shared cache.

Example 6 includes the method of any of Examples 1-5, wherein periodically obtaining read times in the detection thread comprises setting a measurement zone size, wherein a measurement zone comprises a period of time for cache miss memory read operations followed by a period of idle time without cache miss memory read operations.

Example 7 includes the method of any of Examples 1-6, further comprising pairing the thread under test with a second thread based on the memory profile of the thread under test and a memory profile of the second thread.

Example 8 includes the method of Example 7, wherein pairing the thread under test with the second thread comprises one of: pairing a memory intensive thread under test with a memory intensive second thread, the thread under test and the second thread having non-overlapping memory access profiles; pairing a memory intensive thread under test with a computational intensive second thread; and pairing a memory intensive thread under test with an input/output intensive second thread.

Example 9 includes a program product comprising a processor-readable medium on which program instructions are embodied, wherein the program instructions are configured, when executed by a multi-core processor, to cause the multi-core processor to: generate, via a second core of the multi-core processor, a pattern of cache miss memory read bursts to access a memory shared by a first core and the second core of the multi-core processor while a thread under test is being executed on the first core; periodically measure read times indicating the amount of time taken to complete the generated cache miss memory read bursts; and determine a memory profile of the thread under test based on the measured read times of the generated cache miss memory read bursts.

Example 10 includes the program product of Example 9, wherein the program instructions are further configured to cause the multi-core processor to begin generating the pattern of cache miss memory reads when execution of the thread under test starts and to generate the pattern of cache miss memory reads for the same duration as the thread under test.

Example 11 includes the program product of any of Examples 9-10, wherein the program instructions are further configured to cause the multi-core processor to partition a shared cache such that the generated cache miss memory reads and the thread under test do not contend for access to the shared cache.

Example 12 includes the program product of any of Examples 9-11, wherein the program instructions are further configured to cause the multi-core processor to generate a pattern of groups of memory read bursts in each of a plurality of frames, the groups of bursts in each frame separated from each other by a period of no memory access activity.

Example 13 includes the program product of any of Examples 9-12, wherein the program instructions are further configured to cause the multi-core processor to adjust a measurement zone size, wherein a measurement zone comprises a specified period of idle time without cache miss memory read operations.

Example 14 includes the program product of any of Examples 9-13, wherein the program instructions are further configured to cause the at least one programmable processor to measure a Time Stamp Counter from the at least one programmable processor to measure the total read times of the generated cache miss memory read bursts.

Example 15 includes a system comprising: a memory; and a multi-core processor coupled to the memory, the multi-core processor comprising: a first core executing a first thread; and a second core executing a second thread configured to generate a pattern of cache miss memory read operations to access the memory; wherein the multi-core processor is configured to schedule the second thread to execute in parallel with the first thread; wherein the second thread is further configured to periodically obtain measurements of read times for performing the cache miss memory read operations; wherein the measurements of read times for performing the cache miss memory read operations indicate a memory access profile of the first thread.

Example 16 includes the system of Example 15, wherein the multi-core processor is configured to schedule the first thread and second thread to execute with approximately the same thread budget and period.

Example 17 includes the system of any of Examples 15-16, wherein the multi-core processor is configured to schedule the second thread to start at the same time as the first thread and to execute for the same duration as the first thread.

Example 18 includes the system of any of Examples 15-17, wherein the second thread is configured to generate a pattern of groups of memory read bursts in each of a plurality of frames, the groups of bursts in each frame separated from each other by a period of no memory access activity.

Example 19 includes the system of any of Examples 15-18, wherein the multi-core processor includes a cache shared by the first core and the second core, wherein the multi-core processor is configured to partition the shared cache such that the first thread and the second thread do not interfere at the shared cache.

Example 20 includes the system of any of Examples 15-19, wherein the measurements of read time are based on a Time Stamp Counter of the multi-core processor.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method of non-intrusively measuring a memory profile of a thread under test, the method comprising:
   executing a detection thread in parallel with the thread under test, the thread under test executed on a first core of a multi-core processor and the detection thread executed on a second core of the multi-core processor;
   generating a pattern of cache miss memory reads on the detection thread in order to access a memory shared by the first core and the second core;
   periodically obtaining read times in the detection thread indicating the amount of time taken to complete the cache miss memory reads generated on the detection thread;
   determining the memory profile of the thread under test based on the obtained read times of the detection thread;
   obtaining at least a second memory profile from at least a second thread; and
   with the memory profiles of the thread under test and the at least a second thread, determining how any two threads can be paired based on their memory access profiles;
   wherein pairing of the any two threads, comprises one of:
      pairing a memory intensive thread with another memory intensive thread, both having non-overlapping memory access profiles;
      pairing a memory intensive thread with a computational intensive thread; and
      pairing a memory intensive thread with an input/output intensive thread.

2. The method of claim 1, wherein executing the detection thread in parallel with the thread under test includes executing both the detection thread and the thread under test with approximately the same thread budget and period.

3. The method of claim 1, wherein executing the detection thread in parallel with the thread under test comprises scheduling the detection thread to start at the same time as the thread under test and to execute for the same duration as the thread under test.

4. The method of claim 1, wherein generating a pattern of cache miss memory reads with the detection thread comprises generating a pattern of groups of memory read bursts in each of a plurality of frames, the groups of bursts in each frame separated from each other by a period of no memory access activity.

5. The method of claim 1, further comprising partitioning a cache shared by the first core and the second core such that the detection thread and the thread under test do not interfere at the shared cache.

6. The method of claim 1, wherein periodically obtaining read times in the detection thread comprises setting a measurement zone size, wherein a measurement zone comprises a period of time for cache miss memory read operations followed by a period of idle time without cache miss memory read operations.

7. A program product comprising a processor-readable non-transatory medium on which program instructions are embodied, wherein the program instructions are configured, when executed by a multi-core processor, to cause the multi-core processor to:
   generate, via a second core of the multi-core processor, a pattern of cache miss memory read bursts to access a memory shared by a first core and the second core of the multi-core processor while a thread under test is being executed on the first core;
   periodically measure read times indicating the amount of time taken to complete the generated cache miss memory read bursts;
   determine a memory profile of the thread under test based on the measured read times of the generated cache miss memory read bursts; and
   obtain at least a second memory profile from at least a second thread; and
   with the memory profile of the thread under test and the at least a second thread, determine how any two threads can be paired based on their memory access profiles;
   wherein pairing of the any two threads, comprises one of:
      pairing a memory intensive thread with another memory intensive thread, both having non-overlapping memory access profiles;
      pairing a memory intensive thread with a computational intensive thread; and
      pairing a memory intensive thread with an input/output intensive thread.

8. The program product of claim 7, wherein the program instructions are further configured to cause the multi-core processor to begin generating the pattern of cache miss memory reads when execution of the thread under test starts and to generate the pattern of cache miss memory reads for the same duration as the thread under test.

9. The program product of claim 7, wherein the program instructions are further configured to cause the multi-core processor to partition a shared cache such that the generated cache miss memory reads and the thread under test do not contend for access to the shared cache.

10. The program product of claim 7, wherein the program instructions are further configured to cause the multi-core processor to generate a pattern of groups of memory read bursts in each of a plurality of frames, the groups of bursts in each frame separated from each other by a period of no memory access activity.

11. The program product of claim 7, wherein the program instructions are further configured to cause the multi-core processor to adjust a measurement zone size, wherein a measurement zone comprises a specified period of time for cache miss memory read operations followed by a specified period of idle time without cache miss memory read operations.

12. The program product of claim 7, wherein the program instructions are further configured to cause the at least one programmable processor to measure a Time Stamp Counter from the at least one programmable processor to measure the total read times of the generated cache miss memory read bursts.

13. A system comprising:
   a memory; and
   a multi-core processor coupled to the memory, the multi-core processor comprising:
   a first core executing a first thread; and
   a second core executing a second thread configured to generate a pattern of cache miss memory read operations to access the memory;
   wherein the multi-core processor is configured to schedule the second thread to execute in parallel with the first thread;
   wherein the second thread is further configured to periodically obtain measurements of read times for performing the cache miss memory read operations;
   wherein the measurements of read times for performing the cache miss memory read operations indicate a memory access profile of the first thread; and
   wherein the multi-core processor is further configured to pair the first thread with at least a third thread after obtaining the memory access profile of the first thread and a memory access profile of the third thread;

wherein pairing of the first and third threads comprises one of:

pairing a memory intensive thread with another memory intensive thread, both having non-overlapping memory access profiles;

pairing a memory intensive thread with a computational intensive thread; and pairing a memory intensive thread with an input/output intensive thread.

14. The system of claim 13, wherein the multi-core processor is configured to schedule the first thread and second thread to execute with approximately the same thread budget and period.

15. The system of claim 13, wherein the multi-core processor is configured to schedule the second thread to start at the same time as the first thread and to execute for the same duration as the first thread.

16. The system of claim 13, wherein the second thread is configured to generate a pattern of groups of memory read bursts in each of a plurality of frames, the groups of bursts in each frame separated from each other by a period of no memory access activity.

17. The system of claim 13, wherein the multi-core processor includes a cache shared by the first core and the second core, wherein the multi-core processor is configured to partition the shared cache such that the first thread and the second thread do not interfere at the shared cache.

18. The system of claim 13, wherein the measurements of read time are based on a Time Stamp Counter of the multi-core processor.

\* \* \* \* \*